Aug. 15, 1950    H. J. BRUSHABER    2,518,661
CONDUIT FITTING
Filed Nov. 5, 1947
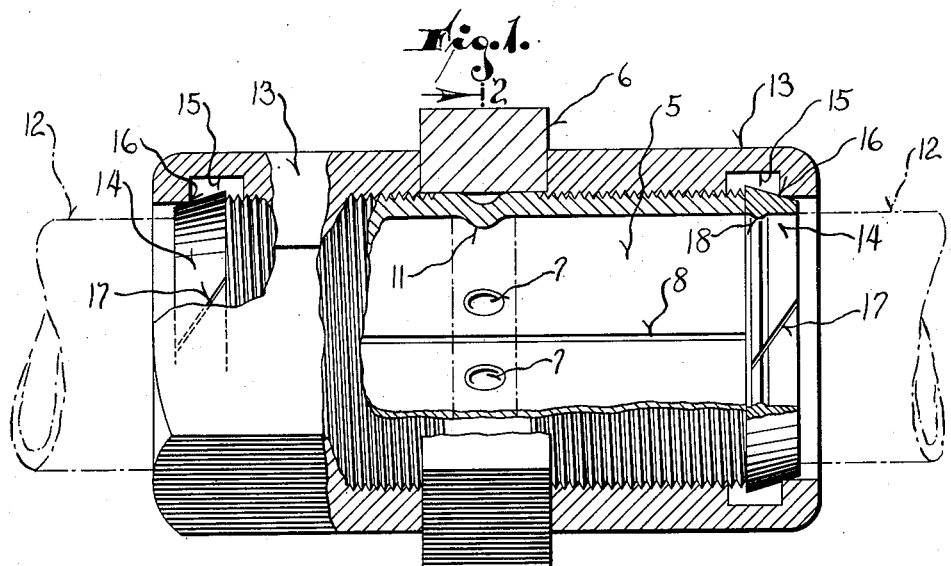
Fig. 1.
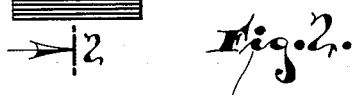
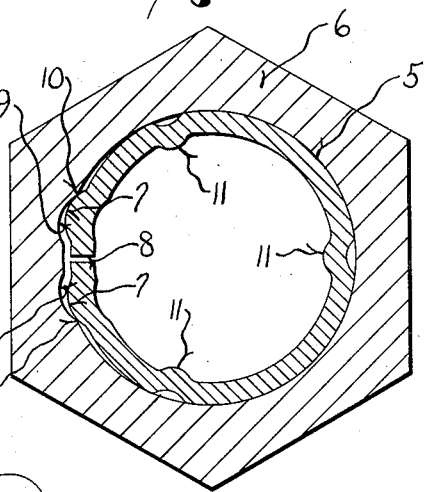
Fig. 2.
Fig. 3.
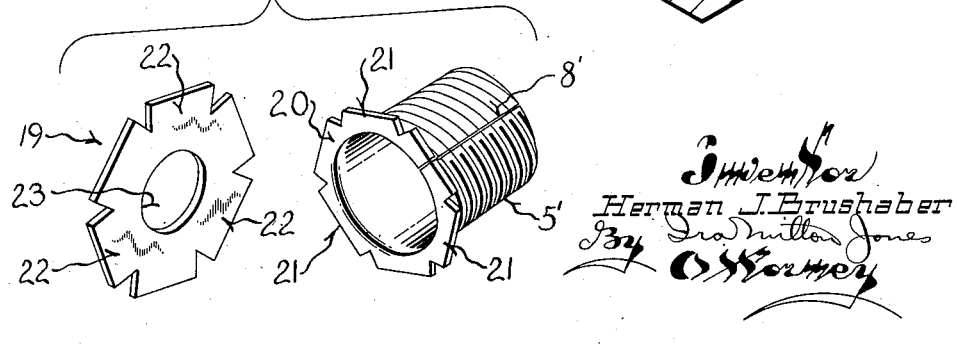
Fig. 4.
Inventor
Herman J. Brushaber
By Ira Milton Jones
C. Wormey Patented Aug. 15, 1950

2,518,661

UNITED STATES PATENT OFFICE 2,518,661

CONDUIT FITTING

Herman J. Brushaber, Milwaukee, Wis.; Ralph E. Brushaber executor of said Herman J. Brushaber, deceased Application November 5, 1947, Serial No. 784,262

5 Claims. (Cl. 285—122)

This invention relates to conduit fittings and refers particularly to a coupling for connecting lengths of electric conduit and other pipe in end-to-end relation and without entailing threading the conduit or pipe, and also for connecting such conduit or pipe to an outlet box or the like.

One of the objects of this invention is to provide a fitting of the character described which is inexpensive to produce.

Another object of this invention is to provide a fitting so designed and constructed that the juncture obtained thereby may be rated as water tight.

Another object of this invention is to provide a fitting of the character described wherein one of the major elements is formed as a sheet metal stamping rolled up into a sleeve.

Another object of this invention is to provide an improved manner of clamping a coupling of this type to a smooth surfaced conduit, pipe, or other cylindrical member.

Still another object of this invention is to provide an inexpensive but effective manner of holding the sleeve of the fitting in its proper cylindrical form and at the same time provide means for holding the sleeve against turning.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates several complete examples of the physical embodiment of the invention constructed according to the best modes so far devised for the practical application of the principles thereof, and in which:

Figure 1 is a view partially in longitudinal section and partially in side elevation of a fitting embodying this invention;

Figure 2 is a cross sectional view taken through Figure 1 on the plane of the line 2—2;

Figure 3 is a view partially in side elevation and partially in longitudinal section of a slightly modified form of the invention, illustrating its adaptation to the anchorage of conduit to an outlet box; and Figure 4 is a perspective view of the two parts of the fitting.

Referring now particularly to the accompanying drawing, the numeral 5 designates a cylindrical sleeve which has been rolled up from a flat sheet metal stamping. A collar 6 encircles the sleeve at its middle to give it rigidity and hold it round. Two outward protrusions 7 are formed in the sleeve on its transverse median plane so as to lie inside the collar 6 when the parts are assembled. One of these protrusions is at each side of the line of juncture 8 between the longitudinal edges of the stamping from which the sleeve is formed. Preferably they are equispaced from the juncture 8.

The protrusions 7 engage the indentations or grooves 9 in the bore of the collar 6, but because the spacing between these indentations or grooves is less than the distance between the protrusions 7, the outer corners 10 of the indentations engage the adjacent outer sides of the protrusions in a way to draw the edges of the juncture 8 toward each other when the collar is press-fitted onto the sleeve. As a result the inherent resiliency of the sleeve is utilized to assure a tight grip between it and the collar, and in addition assurance is had against relative rotation between the collar and sleeve so that the collar, which is preferably hexagonal in cross section provides means for holding the sleeve against turning.

The sleeve also has a plurality of indentations 11 in its wall substantially in transverse alignment with the protrusions 10. These indentations 11 cooperate to provide stops to limit the insertion of conduits 12 or other cylindrical members into the ends of the sleeve.

Nuts 13 are threaded onto the ends of the sleeve to coact with sealing rings 14 in clamping conduit to the ends of the sleeve. Each nut 13 has an annular channel or groove 15 in its bore near its outer end. This channel or groove provides an abrupt annular shoulder 16 opposite the end of the sleeve. The sealing ring 14 is interposed between this annular shoulder and the end of the sleeve, and by virtue of its wedge shaped cross section tightening of the nut onto the sleeve contracts the sealing ring into gripping engagement with the conduit or other cylindrical member which it encircles. Obviously the thick end of the sealing ring must bear against the end of the sleeve and the outer surface of the sealing ring which engages the annular shoulder 16 should be conical or suitably inclined.

To allow for contraction of the sealing ring, it is split diagonally as at 17, and to insure gripping of the conduit 12 an annular bead 18 is formed on the inner surface of the ring. The cross sectional dimensions of the sealing ring are such that when the inner ends of the nuts bear firmly against the faces of the collar 6, the sealing rings will have been forced into secure clamping engagement with the conduits 12. In this manner each conduit is securely gripped and anchored to the sleeve, and by virtue of the fact that the opposite faces of the collar 6 are normal to the axis of the sleeve and the inner ends of the nuts have a flat surface-to-surface engagement therewith a water tight connection is obtained between the conduits.

In that form of the invention illustrated in

Figures 3 and 4, which is directed primarily to a fitting for anchoring conduit to an outlet box or the like, the sleeve 5' is also rolled up from a sheet metal stamping, but in this case it is held round by a stamped collar 19 clinched over an annular flange 20 on one end of the sleeve. This flange is divided into a plurality of segments 21 each of which has a flat outer edge. Preferably the juncture 8' bisects one of the segments 21.

The stamping 19 has radially projecting segments 22, one folded or clinched over each segment 21. Thus when in position as shown in Figure 3, the collar comprising the stamping 19 and the flange 20 provides a rigid reinforcement for the sleeve and firmly holds it in its proper cylindrical shape.

To allow the passage of wires through the fitting the stamping 19 has a hole 23 which, however, is smaller in diameter than the bore of the sleeve. Thus the stamping 19, when in position, provides a shoulder or stop against which the end of the conduit 12' may be brought to properly locate the same.

The manner of clamping the sleeve to the conduit 12' is the same as that previously described. In other words, a nut 13' is threaded onto the sleeve and coacts with the outer end thereof to contract a sealing ring 14' into gripping engagement with the conduit 12'. In this case, however, the dimensions of the parts are such that when the sealing ring is contracted into gripping engagement with the conduit the space between the inner end of the nut 13 and the face of the collar 6, specifically the in-turned edges of the segment 22, is such as to snugly clamp the wall of an outlet box (not shown) therebetween.

From the foregoing description taken in connection with the accompanying drawing, it will be readily apparent that this invention provides a fitting especially well adapted for use in coupling lengths of conduit and for anchoring such conduit to outlet boxes. It will also be apparent that by virtue of the novel construction here embraced a water tight coupling is assured.

What I claim as my invention is:

1. A conduit coupling comprising: a sleeve having at least one of its end portions exteriorly threaded, said end of the sleeve being substantially flat and perpendicular to the axis of the sleeve; a nut threaded onto the sleeve, said nut being internally undercut near its outer end so as to present an annular shoulder facing the adjacent flat end of the sleeve; and a clamping ring confined between said annular shoulder and the adjacent flat end of the sleeve, said clamping ring being contractible and having a conical outer surface against which the annular shoulder bears so that tightening the nut onto the sleeve contracts the clamping ring.

2. In a fitting of the character described: an externally threaded sleeve of substantially uniform cross-section throughout its length and having a flat outer end, said sleeve being adapted to receive a smooth surfaced cylinderical member; and means for clamping the sleeve to a cylindrical member received therein comprising, a nut threaded onto the sleeve, said nut having an annular groove in its bore near the outer end of the nut to define an annular shoulder, said shoulder approaching the flat outer end of the sleeve upon tightening the nut onto the sleeve, and a contractible sealing ring interposed between said annular shoulder and the adjacent flat end of the sleeve, said sealing ring having substantially a wedge shaped cross section with its thickest end bearing against the flat end of the sleeve and the annular shoulder engaging the inclined outer annular surface of the ring, so that upon tightening the nut onto the sleeve the ring is contracted into gripping engagement with a cylindrical member received within the sleeve.

3. A fitting of the character described comprising: a sleeve split longitudinally and rolled up from a flat sheet metal stamping, said sleeve having opposed outward protrusions adjacent to the split therein; and a collar press-fitted onto the sleeve, said collar having a pair of indentations in its bore spaced apart slightly less than the spacing between the protrusions on the sleeve, and said protrusions extending into the indentations and being forced thereby toward each other so as to draw the edges of the sleeve defining the split therein toward each other.

4. A fitting of the character described comprising: a cylindrical sleeve rolled up from a sheet metal stamping and being longitudinally split; a collar press-fitted onto the sleeve to hold the same round and provide means for holding the sleeve against rotation; cooperating interengaging abutments on the sleeve and the collar for drawing the edges of the split in the sleeve toward each other; said sleeve being screw threaded at its opposite ends; the side faces of the collar being perpendicular to the axis of the sleeve; a nut threaded on each end portion of the sleeve with the inner end thereof adapted to bear against the adjacent side face of the collar, said nuts having annular shoulders in the outer ends of their bores spaced from the adjacent ends of the sleeve when the inner ends of the nuts bear against the sides of the collar; and contractible sealing rings confined between said annular shoulders and the adjacent ends of the sleeve, said sealing rings having a wedge shaped cross section with the thick ends bearing against the ends of the sleeve and conical outer surfaces engaged by the annular shoulders, said sleeves being of such cross sectional size as to be contracted into snug clamping engagement with cylindrical members inserted into the sleeve from the opposite ends thereof, before the ends of the nuts bear against the side faces of the collar.

5. In a fitting of the character described: a cylindrical sleeve rolled up from a stamped sheet metal blank and having an annular outwardly directed flange at one end, said flange being divided into segments having straight outer edges so that said segments together define a polygon; and a collar fitted over the flange, said collar being stamped from sheet metal and having a flat wall with a hole therethrough smaller than the bore of the sleeve and a plurality of radially disposed tongues, each struck over one of the segments of the flange.

HERMAN J. BRUSHABER.

REFERENCES CITED

The following references are of record in the file of this patent:

UNITED STATES PATENTS

| Number | Name | Date |
|---|---|---|
| Re. 14,077 | Hall | Feb. 20, 1916 |

FOREIGN PATENTS

| Number | Country | Date |
|---|---|---|
| 478,292 | Great Britain | Jan. 14, 1938 |